United States Patent [19]

Gadkaree

[11] Patent Number: 4,919,991
[45] Date of Patent: Apr. 24, 1990

[54] HYBRID CERAMIC MATRIX COMPOSITE ARTICLES COMPRISING PARTICULATE ADDITIVES AND METHOD

[75] Inventor: Kishor P. Gadkaree, Big Flats, N.Y.

[73] Assignee: Corning Incorporated, Corning, N.Y.

[21] Appl. No.: 197,296

[22] Filed: May 23, 1988

[51] Int. Cl.$^5$ ............... C03C 10/06; C03C 10/08; C03C 14/00; B32D 18/00

[52] U.S. Cl. ............... 428/113; 501/8; 501/9; 501/32; 428/107; 428/112; 428/114; 428/294; 428/367; 428/697; 428/698

[58] Field of Search ............... 501/15, 17, 32, 8, 9, 501/89, 95; 428/697, 698, 107, 112, 113, 114, 294, 367

[56] References Cited

U.S. PATENT DOCUMENTS

| | | | |
|---|---|---|---|
| 4,324,843 | 4/1982 | Brennan et al. | 428/697 |
| 4,464,192 | 8/1984 | Layden et al. | 65/18.1 |
| 4,464,475 | 8/1984 | Beall et al. | 501/9 |
| 4,615,987 | 10/1986 | Chyung et al. | 501/8 |
| 4,626,515 | 12/1986 | Chyung et al. | 501/32 |
| 4,755,489 | 7/1988 | Chyung | 501/8 |
| 4,788,162 | 11/1988 | Hillig | 501/5 |

OTHER PUBLICATIONS

J. G. Baldoni et al. in "Mechanical Properties and Wear Resistance of Silicon Nitride-Titanium Carbide Composites," *Tailoring Multiphase and Composite Ceramics*, Materials Science Research, vol. 20, R. E. Tressler et al., Editors, Plenum, New York, 1987.

P. Hing et al., "The Strength and Fracture Properties of Glass-Ceramics," *Journal of Materials Science*, 8, (1973) pp. 1041-1048.

G. C. Wei et al., "Improvements in Mechanical Properties in SiC by the Addition of TiC Particles," *Journal of the American Ceramic Society*, 67 (8), pp. 571-574 (Aug. 1984).

T. Mah et al., "Fracture Toughness and Strength of $Si_3N_4$ Composites," *Ceramic Bulletin*, 60 (11), pp. 1229-1231, 1240, (1981).

Primary Examiner—Mark L. Bell
Attorney, Agent, or Firm—Kees van der Sterre

[57] ABSTRACT

Ceramic matrix composites and a method for making them are provided, the composites comprising a matrix of an alkaline earth aluminosilicate glass or an alkaline earth aluminosilicate glass-ceramic reinforced with inorganic fibers such as silicon carbide fibers, and the matrix being modified by the incorporation therein of an inorganic particulate additive, the additive being present in a proportion at least effective to increase the interlaminar shear strength, transverse flexural strength, and/or fracture toughness of the composites.

11 Claims, 1 Drawing Sheet

HYBRID CERAMIC MATRIX COMPOSITE ARTICLES COMPRISING PARTICULATE ADDITIVES AND METHOD

BACKGROUND OF THE INVENTION

The present invention relates generally to ceramic matrix composites, and more particularly to ceramic matrix composites reinforced with combinations of inorganic fibers and inorganic particles which exhibit enhanced interlaminar shear strength and other desirable properties.

The use of inorganic whiskers and fibers to reinforce glasses, glass-ceramics, and ceramics has long been practiced. The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material. Whiskers are thought to impart strengthening by a similar mechanism, but load transfer to whiskers by the matrix is more limited due to the limited length and aspect ratio of the whiskers. Theoretically, a whisker which is sufficiently short will not be loaded to the breaking point by the matrix under stress, and therefore full advantage cannot be taken of the high strength of the whiskers.

Among the fibers and whiskers which have been suggested for use as reinforcement for non-metal matrix materials are silicon carbide, silicon nitride, alumina and carbon whiskers. For example, U.S. Pat. No. 4,324,843 describes SiC fiber reinforced glass-ceramic composite bodies wherein the glass-ceramic matrix is of aluminosilicate composition. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

A principal objective of whisker reinforcement in glass, ceramic and glass-ceramic materials for high temperature applications is that of increasing the toughness of the material. A toughened ceramic material exhibits improved resistance to cracking failure from flaws sustained in use, offering the possibility of increased fatigue lifetime As noted in U.S. Pat. No. 4,626,515, the addition of fiber reinforcement to glasses such as alkali-free alkaline earth aluminosilicate glasses can result in substantial strengthening, while whisker additions to those glasses were found effective to enhance the toughness of the glass.

Many of the fiber-reinforced composites described in the prior art are of laminar type, i.e., the fiber reinforcement is preferentially disposed in layers within the material, with the layers consisting of fiber groups or arrays wherein the fibers within each layer are principally disposed in substantially parallel alignment in a single direction, termed the fiber direction of the layer. Each such layer may be characterized as unidirectional in that the fibers in the layer will all be oriented in substantially the same axial direction (typically ±5°).

Ceramic matrix composites to be utilized in high-stress, high-temperature environments, will desirably exhibit not only high bending strength and fracture toughness, but also strength properties which are relatively isotropic, i.e., not confined to a single "strong" axis of the composite material. The attainment of such properties in laminar systems normally requires at least some cross-ply lamination of fiber reinforced laminae in the material since, as has been observed, whiskers alone cannot impart the necessary high isotropic flexural strength to the material.

In fiber-reinforced ceramic matrix composite of uniaxial fiber orientation, transverse flexural strengths, i.e., strengths in bending about axes parallel to the fiber direction, are generally at least two orders of magnitude lower than strengths in bending across the fiber direction. In cross-ply laminates, additional strength factors such as interlaminar shear strength must be considered. Stresses applied to the laminated structure in directions parallel to the planes of lamination give rise to shear stresses within interlaminar regions of the composite, which regions are not effectively fiber reinforced. These regions therefore exhibit relatively low strength and provide preferred paths for crack propagation, so that layer separation and delamination of the composite under stress can occur.

Attempts to improve such properties have resulted in the development of so-called hybrid ceramic composites, which are composites containing both fiber reinforcement and an added whisker phase. In U.S. Pat. No. 4,615,987, for example, a combination of fibers and whiskers was introduced into an anorthite (CaO—Al$_2$O$_3$—SiO$_2$) glass-ceramic matrix to enhance physical properties, while in copending, commonly assigned patent application Ser. No. 47,128, filed May 8, 1987, whisker-containing fiber-reinforced ceramic matrix composites having a lithium aluminosilicate matrix reinforced with SiC or similar fibers are disclosed.

There are, however, some disadvantages associated with the inclusion of inorganic whiskers in fiber-reinforced ceramic matrix composites. For example, in some systems, the increases in transverse flexural strength and interlaminar shear strength which have been attained are partially offset by losses in flexural strength in the strong axis of the material. The mechanism for such strength losses have not been fully explained. Another disadvantage connected with the use of whiskers is the somewhat high cost of the commercially available whisker materials.

The process of crack propagation in systems comprising particulate rather than fibrous inclusions has also been the subject of study, with mixed results. One study of the fracture properties of glass-ceramics, reported by P. Hing et al. in "The Strength and Fracture Properties of Glass-ceramics", *Journal of Materials Science,* 8 (1973), pages 1041–1048, suggested an increase in strength and effective surface energy for crack initiation as the mean free path in the intercrystalline glass of a lithium disilicate glass-ceramic decreased. Further, G. C. Wei et al., in "Improvements In Mechanical Properties in SiC By The Addition of TiC Particles", *Journal of the American Ceramic Society,* 67 (8), pp. 571–574 (August 1984), found an increase in toughness and flexural strength with TiC additions to a silicon carbide system in proportions up to about 25% by volume.

On the other hand, T. Mah et al. in "Fracture Toughness and Strength of Si$_3$N$_4$ Composites", *Ceramic Bulletin,* 60 (11), pp. 1229–1231, 1240, (1981), found a decrease in strength to accompany an increase in fracture toughness in a silicon nitride ceramic system containing a titanium carbide second phase. This was attributed to residual stresses in the two-phase composite, possibly accentuated by flaws developed at the interface between the silicon carbide matrix and titanium carbide agglomerates present therein. Similar results were reported by J. G. Baldoni et al. in "Mechanical Properties and Wear Resistance of Silicon Nitride-Titanium Carbide Composites", published in *Tailoring Multiphase and Composite Ceramics,* MATERIALS SCIENCE RESEARCH, Volume 20, R. E. Tressler et. al., Editors, Plenum, New York, 1987.

It is evident from the literature, therefore, that the strengthening or toughening of ceramic systems by the introduction of second phase particles therein, if any, is manifestly different for different systems, due to factors such as differences in matrix fracture energies, differing bond strengths between the additive and the matrix, and other variables. The prediction of changes in fracture energy by the addition of additives to any particular system is thus quite difficult, and this difficulty is further compounded if additional phases such as reinforcing fibers are present in the system. Nevertheless, because of the very wide range of possible applications, there is considerable interest in refractory ceramic materials exhibiting improved strength and toughness.

It is a principal object of the present invention to provide a novel fiber reinforced composite system wherein significant enhancements in fracture energy can conveniently and economically be provided.

It is a further object of the invention to provide a laminar fiber-reinforced composite system wherein improved transverse flexural strength and interlaminar shear strength can be realized.

Other objects and advantages of the invention will become apparent from the following description thereof.

SUMMARY OF THE INVENTION

The present invention provides novel fiber-reinforced ceramic matrix composites and a method for making them which economically and dependably provides products of enhanced microcrack yield stress, transverse strength, and/or interlaminar shear strength. The composite products of the invention may be broadly characterized as ceramic matrix composites in which inorganic reinforcing fibers are disposed, and wherein the matrix contains an inorganic particulate additive effective to improve the aforementioned physical properties. By a particulate additive is meant, in contradistinction to additives such as whiskers which are more conventional in fiber-containing composites, an additive consisting of inorganic particles of low aspect ratio, i.e., aspect ratios below 2:1, more particularly of about 1:1.

These products may be referred to as hybrid composites, since two separate and distinct matrix additions are present, but the so-called particulate-fiber hybrids of the invention offer specific advantages over whisker and other hybrid types, as will hereinafter appear.

More specifically, the invention includes ceramic matrix composite articles wherein the matrix has a composition consisting essentially of a ceramic material selected from the group consisting of alkaline earth aluminosilicate glasses and alkaline earth aluminosilicate glass-ceramics, and wherein the aluminosilicate matrix has inorganic reinforcing fibers disposed therein in layered or other suitable fashion. In addition, however, the composites comprise a particulate additive, dispersed in the matrix encasing the fibers, with the additive being present in a proportion at least effective to increase the interlaminar shear strength, transverse flexural strength, or microcrack yield stress of the article.

The inorganic reinforcing fibers are typically yarns, single filaments, or chopped yarns or filaments of an inorganic material. The material selected is one which is sufficiently stable and refractory to withstand the high temperature processing needed to consolidate and/or crystallize the ceramic matrix and sufficiently strong to improve the ultimate strength of the composite.

Broadly stated, the method for making a fiber-reinforced ceramic matrix composite in accordance with the invention comprises, first, selecting a ceramic matrix material for the composite from the group consisting of alkaline earth aluminosilicate glasses and alkaline earth aluminosilicate glasses thermally convertible to glass-ceramics. The matrix material thus provided is then combined, typically in particulate form, i.e., as a powder, with an inorganic particulate additive, the additive normally having a softening or melting temperature at least above the softening temperature of the ceramic matrix material, and being introduced in a proportion effective to achieve the desired improvements in physical properties.

The resulting mixture, termed a matrix mixture, is then combined by conventional means with a selected fibrous inorganic reinforcement material to form a fiber-containing preform. The reinforcement material will again normally have a softening or melting temperature at least above the softening temperature of the ceramic matrix material, permitting the fibers to effectively withstand the subsequent processing of the preform. Finally, the preform thus prepared is consolidated with heat and pressure, and optionally crystallized, to provide a dense, substantially void-free fiber-reinforced ceramic matrix composite wherein the particulate additive is uniformly dispersed in the ceramic matrix.

Advantages of the invention include significant improvements in physical properties when compared with fiber-reinforced composites free of inorganic particulate additives. Specifically, the products of the invention exhibit improved microcrack yield stress, interlaminar shear strength, and transverse flexural strength as hereinafter more fully described. Further, the use of particulate material rather than fine whisker material for matrix enhancement substantially facilitates the mixing and consolidation processing needed to manufacture the composite materials.

DESCRIPTION OF THE DRAWING

The invention may be further understood by reference to the drawings wherein.

DETAILED DESCRIPTION

Figure 1:
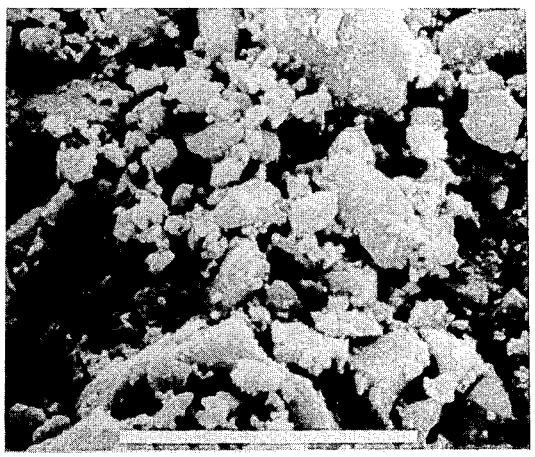
FIG. 1 is an electron photomicrograph of a preferred particulate additive material useful in accordance with the invention.

In a preferred embodiment, the manufacture of ceramic matrix composites in accordance with the invention involves combining a selected alkaline earth aluminosilicate glass material for the matrix with a selected silicon carbide (SiC) particulate additive material in controlled proportions effective to provide the desired properties enhancements. The amount of additive used must be sufficient to provide enhancement of the physical properties of the ultimate fiber-reinforced composite, yet insufficient to objectionably degrade the ultimate strength thereof.

The particularly preferred particulate additive is a non-abrasive particulate SiC material or powder, commercially sold and designated as "spherical" SiC powder, and the following description deals principally with this material even though the invention is not limited thereto. This material is substantially free of abrasive particles, i.e., particles characterized by sharp edges or corners and conventionally sold as an abrasive grain material. Refractory particles other than SiC may alternatively be employed provided they are sufficiently refractory and non-reactive with the selected alkaline earth aluminosilicate matrix so as to be retained as an identifiable particulate phase in the consolidated composite product. Examples of alternative materials include particulate alumina ($Al_2O_3$), boron carbide ($B_4C$), and zirconia ($ZrO_2$)

The fibers used for composite reinforcement in accordance with the invention may consist of fibers known for use as ceramic matrix reinforcement fibers, such as silicon carbide or oxycarbide, carbon, alumina, $B_4C$, BN, zircon, mullite, spinel or silicon nitride fibers. Frequently, these fibers will be disposed in axial alignment in identifiable layers within the matrix material, the composite product having been provided by the consolidation of stacked prepreg sheets of substantially parallel, matrix-embedded fibers. These composites will hereinafter sometimes be referred to as laminar composites because of the layered configuration of the fibers present therein.

The invention is particularly useful for the strengthening of laminar composites, because of the beneficial effects thereof upon the so-called off-axis properties thereof. By off-axis properties is meant physical properties relating to the strength of the laminar composite in directions or planes not reinforced by the embedded fibers, particularly including interlaminar shear strength and transverse flexural strength.

A particularly preferred fiber reinforcement material for present purposes is a fiber material selected from the group consisting of silicon carbide fiber and silicon oxycarbide fiber, the latter being commercially available as Nicalon ® fiber in the form of a fiber yarn which may be conveniently impregnated with the selected matrix material and formed by winding or the like into fiber-reinforced prepreg sheet. The resulting sheets may then be stacked, heated to achieve burnout of any organic constituents, and finally heated to effect consolidation and optionally crystallization thereof into a dense, substantially void-free ceramic matrix composite material. Consolidation may be achieved by sintering, hot pressing, hot isostatic pressing, or similar known consolidation procedures.

The ceramic matrix materials used for composite fabrication in accordance with the present invention are selected from the group consisting of aluminosilicate glasses and alkaline earth aluminosilicate glass-ceramics. The glass-ceramic matrix materials are selected and crystallized from alkaline earth aluminosilicate glasses which may be thermally crystallized to products wherein the predominant crystal phase is selected from the group of anorthite and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$) albite solid solution ($Na_2O.Al_2O_3.6SiO_2$), $Al_2O_3$, $SiO_2$, $CaO.SiO_2$, and gehlenite ($2CaO.Al_2O_3.Si_2O_2$). Alternatively, the glasses are selected from among those containing from 10–50 mole percent excess alumina and being thermally crystallizable to yield a predominant crystal phase in consisting essentially of triclinic anorthite and at least one of mullite and alpha alumina. By predominant crystal phase is meant a crystal phase or phase group predominating in the glass-ceramic component of the glass-ceramic/additive matrix, i.e., constituting more that 50% by volume of the glass-ceramic component.

Glasses crystallizable to the former type of glass-ceramics are known, and have been utilized in the manufacture of whisker-containing ceramic matrix composites as reported, for example, in U.S. Pat. No. 4,615,987. Such glass typically have a composition within the following ranges, as defined in weight percent on the oxide basis:

| CaO | 0–25 | MgO | 0–15 |
|---|---|---|---|
| SrO | 0–30 | $Na_2O$ | 0–4 |
| CaO + SrO | 10–30 | $K_2O$ | 0–6 |
| $Al_2O_3$ | 25–38 | $TiO_2$ | 0–12 |
| $SiO_2$ | 35–60 | $ZrO_2$ | 0–15 |
| BaO | 0–25 | $As_2O_3$ | 0–3 |
| | | $BaO + MgO + Na_2O + K_2O + TiO_2 + ZrO_2 + As_2O_3$ | 0–30 |

Glasses containing excess alumina and being thermally crystallizable to a predominant crystal phase consisting of anorthite plus at least one of mullite and alumina are also known, being described, for example, in copending, commonly assigned patent application Ser. No. 943,072 filed Dec. 18, 1986. Such glasses typically have a composition within the range of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, the composition being substantially free of $TiO_2$ and containing $Al_2O_3$ in an amount which is at least 10 mole percent and up to 50 mole percent in excess of that present in stoichiometric triclinic anorthite.

Aluminosilicate glasses useful as matrix materials in the composites of the invention may be characterized as alkali-free alkaline earth aluminosilicate glasses, being substantially free of alkali metal oxides such as $Na_2O$, $Li_2O$, and $K_2O$, and including one or more alkaline earth metal oxides selected from the group consisting of CaO, MgO, SrO and BaO. Such glasses will preferably consist essentially, in weight percent on the oxide basis, of about 50–66% $SiO_2$, 11–19% $Al_2O_3$, 20–30% total of RO, wherein RO consists of one or more oxides selected from the group consisting of CaO, MgO, SrO and BaO, 0–8% $B_2O_3$, and 0–2% of $As_2O_3$.

As is known from U.S. Pat. No. 4,485,179, $Nb_2O_5$ and/or $Ta_2O_5$ may be useful in ceramic matrix composites not only as nucleating agents but also to protect SiC fibers from deterioration in use. Therefore, matrix glass-ceramics in accordance with the invention may in some cases contain these oxides as additional constituents, typically in amounts not exceeding 1–10% total of $Ta_2O_5$ or $Nb_2O_5$. Similarly, the inclusion of 0.5–3% $As_2O_3$ can be useful in these matrices to help to protect SiC whiskers and fibers from oxidation.

Powdered glass having the selected composition for the matrix can be prepared by essentially any technique which will produce complete pulverization with a uniform particle size. A preferred procedure is to produce coarse powdered glass by a technique such as dry-gagging, and then to mill the powdered glass, as by ball-milling, to produce very fine, uniform powder. Preferably the milled glass particles will not exceed 325 mesh (U. S. Sieve) in size, and will have an average particle size not exceeding 50 microns.

As above suggested, a variety of factors mitigate against the use of inorganic whiskers in the manufacture of fiber-reinforced ceramic matrix composites. For example, it has been shown that, at high whisker loadings, there can be significant fiber damage resulting in decreases in ultimate strength and strain compared to whisker-free fiber-reinforced systems. Damage to the fibers can occur due to the contact between the fibers and the whiskers during prepregging and hot pressing.

In accordance with the present invention, replacement of the inorganic whiskers by spherical inorganic particles may be a factor aiding in the retention of high flexural strength in the composites. Further, the spherical habit of the particles may facilitate better consolidation of composites as compared with whisker containing hybrids particularly at high particle loadings.

The preferred particulate additive for the enhancement of microcrack yield and other strength factors in accordance with the invention is non-abrasive or so-called "spherical" silicon carbide. While not truly spherical in particle shape, this material is commercially available and is largely free of abrasive crystal forms. Hence, the SiC particles are somewhat rounded and have an average aspect ratio of approximately 1:1, providing good blending and consolidation characteristics while avoiding extensive abrading action on other components of the composite system.

FIG. 1 of the drawing is an electron photomicrograph of a typical sample of a commercially available material of this type, wherein the white bar represents a dimension of about 10 microns. A comparison of this figure with the micrograph of abrasive grain SiC shown in FIG. 2 indicates the general freedom from sharp and abrasive particles of the so-called spherical material.

In a preferred method for preparing composite products in accordance with the invention, a specified quantity of the selected particulate additive is mixed with a quantity of one of the above-disclosed glass powders, for example, by ball milling. This procedure provides a uniform dispersion of the SiC particles in the powdered matrix glass.

Any known method for assembling a fiber-reinforced composite structure from the powdered matrix preparation may be used to provide the final product. One useful technique is to suspend the powdered matrix material in a suitable liquid binder preparation, and to then coat or impregnate the individual fibers or a fiber yarn with the suspension prior to laying up the coated fibers in a desired configuration for a preform.

A fiber preform thus provided may then be consolidated, preferably by hot pressing or hot isostatic pressing, to obtain a dense composite product. If the matrix material selected is a glass-ceramic material, the matrix will be thermally crystallized, during or subsequent to consolidation, to convert the glass phase to the desired glass-ceramic material.

The consolidated ceramic matrix composite thus provided typically exhibits high density in combination with significantly enhanced microcrack yield strength and interlaminar shear strength. Further, these property improvements are obtained without the use of expensive inorganic whiskers, and frequently without objectionable damage to the reinforcing fiber phase of the composite which can produce reductions in ultimate flexural strength. For the purpose of the present invention, transverse flexural strength refers to the modulus of rupture strength of a single-layer or multilayer sample of fiber reinforced ceramic matrix composite material such as above described as determined in flexure perpendicular to the fiber direction of a fiber-aligned layer or sample. Interlaminar shear strength (ILSS) refers to the stress required to cause shear failure of the composite by delamination of laminar sections of the material in one or more planes parallel with the plane of fiber layers therein. Ultimate flexural strength, or axial strength, is the strength of a fiber-aligned composite material in the direction of fiber reinforcement i.e., the strong axis of the material.

The invention may be further understood by reference to the following illustrative examples showing the manufacture of fiber-reinforced ceramic matrix composites in accordance therewith.

EXAMPLE 1

An alkaline earth aluminosilicate glass, commercially available as Code 1723 glass from Corning Glass Works, Corning, NY, is selected for use a composite matrix material This glass has a composition, on the oxide basis, of about 58% $SiO_2$, 15% $Al_2O_3$, 4% $B_2O_3$, 7% MgO, 10% CaO and 6% BaO.

A non-abrasive particulate silicon carbide material, designated a "spherical" silicon carbide powder and commercially available as A-4 Grade ultra high purity SiC powder from the ICD Group, Inc., of New York, NY, USA is selected for use as a matrix additive. This powder has a mean particle size of about 6 μm.

To prepare a blended glass matrix material containing a homogeneous dispersion of the SiC additive, 7.5 parts by weight of the particulate additive are mixed with 92.5 parts by weight of the matrix glass in powder form by ball milling. The ball milling is carried out in a polyethylene jar in an isopropanol vehicle with alumina grinding media. Ball milling is carried out for 1 hour, and the solids are then separated from the resulting slurry by filtration and dried. This procedure results in a uniform dry dispersion of the particles in the the glass powder.

The fiber selected for incorporation in the composite is Nicalon ® silicon oxycarbide fiber yarn, hereinafter sometimes referred to as silicon carbide or SiC yarn or fiber. This yarn is commercially obtainable from the Nippon Carbon Company of Tokyo, Japan. To combine the yarn with the powdered matrix, a slurry is first prepared from the matrix mixture made as described. A quantity of the dry matrix mixture is added in a proportion sufficient to provide a flowable slurry to a liquid binder composition consisting of 92.5 parts isopropanol, 7.5 parts distilled water, and 6 parts of a polyvinyl acetate binder by weight, with high speed blending of the mixture to achieve a homogeneous suspension of the matrix powder in the vehicle.

The SiC fiber yarn is then coated with this slurry by passing a continuous strand of the yarn through the suspension. Prior to immersion in the suspension, the yarn is passed through a flame to remove sizing and other combustible impurities from the surfaces of the fibers. The slurry immersion thoroughly coats and impregnates the yarn with the whisker-powder mixture.

The coated yarn thus produced is next drawn through a stripping die to remove excess slurry, this step being optionally employed where it is desired to achieve a high fiber:matrix ratio in the final composite. The resulting impregnated yarn is then wound around a rotating drum to form a continuous layer or sheet (prepreg) having a unidirectional fiber orientation. After drying, this sheet is cut from the drum to provide a green prepreg mat comprising unidirectional fibers coated with the glass-SiC powder mixture.

To provide a consolidated ceramic matrix composite products from the thus-prepared prepreg mat, rectangular sections approximately 10 cm × 10 cm in size are cut from the mat, and 12 such sections are stacked in uniaxial (fiber parallel) alignment to provide each multilayer preform. The preforms thus provided are then heated to 450° C. in a forced air oven to remove the organic binder constituents therefrom, and are finally consolidated to full density composite plates by hot pressing at a temperature of 1090° C. and a pressure of 1500 psi. for 10 minutes.

Fiber-reinforced ceramic matrix composites produced as described are then evaluated for physical properties. Test samples of the composite material are prepared by grinding the plates to a thickness of about 0.08 inches and then cutting the plates to specimen sizes. The evaluations comprise flexural testing to failure to obtain ultimate strength and microcrack yield stress data. The transverse flexural strength of the samples is determined across 20 mm and 64 mm spans.

Interlaminar shear strength values for these samples are measured using a short beam shear testing method in accordance with ASTM D2344-84. This test is carried out across a 0.25" span with the span-to-sample depth ratio being maintained at 3. All of the described testing is done at room temperature.

A comparison of the physical properties of the particle-containing glass-fiber composite with those of a similarly prepared fiber-reinforced composite comprising the same Nicalon ® reinforcement and glass matrix phase but omitting the particulate additive shows significant improvements resulting from the incorporation of the additive. Specifically, the physical properties evaluations show significant improvements in the microcrack yield stress, interlaminar shear strength, and ultimate flexural strength of the material due to the addition of the particulate SiC matrix additive. Thus the microcrack yield stress increases from a value of about 45 ksi for the additive-free composite to about 73 ksi for the filled composite, while the interlaminar shear strength increases from a value of about 7 ksi to about 21 ksi, and the transverse flexural strength increases from a value of about 1.5 ksi to about 11 ksi. Further, the decrease in ultimate (on-axis) flexural strength (the strength of the material in flexure transverse to the axis of reinforcement) is quite moderate, dropping from a value of 120 ksi for the particle-free material to a value of 113 ksi for the material of the example. Thus a significant net improvement in physical properties is achieved.

Further studies of the effects of additions of this SiC particulate additive material to glass matrix composites such as described above in Example 1 indicate that, in all cases, at least some improvements in microcrack yield stress, interlaminar shear strength, and ultimate flexural strength are observed. Table I below sets forth test data for a series of representative composite compositions including a sample having a composition corresponding to that of Example 1 above. Each of the composite materials reported comprises Nicalon ® silicon fiber reinforcement and an aluminosilicate glass matrix material as utilized in Example 1. However, the loading of particulate SiC additive is varied in each sample to evaluate the effects of particulate additive loading variations on composite properties.

Included in Table 1 for each of four sample compositions are data indicating the proportion of particulate additive in the composition, reported in weight percent of the total matrix material (SiC additive and glass), the microcrack yield stress of the material (MCY) in thousands of pounds per square inch (ksi), the ultimate flexural strength or modulus of rupture strength (MOR) in ksi, the transverse flexural strength to failure (MOR) as determined transverse to the strong or reinforcement axis of the material, and the interlaminar shear strength (ILSS) of the material, in ksi. In all cases the particulate additive used is a so-called spherical SiC additive of approximately 6 μm average particle size.

TABLE 1

| Sample No. | Wt. % Filler | MCY (ksi) | AXIAL MOR (ksi) | TRANSVERSE MOR (ksi) | ILSS (ksi) |
|---|---|---|---|---|---|
| 1 | 0 | 45 | 120 | 1.5 | 7.0 |
| 2 | 5 | 70 | 100 | 8.0 | 15.0 |
| 3 | 7.5 | 73 | 113 | 11.0 | 21.0 |
| 4 | 10 | 63 | 78 | 7.0 | 18.0 |

As the data in Table 1 suggest, for the SiC-particle-containing glass matrix composites shown, the microcrack yield point increases with particulate additive additions from 45 ksi for a additive-free system to 70 ksi at 5 wt. % additive to 73 ksi at 7.5 wt. % additive. As additive loading increases further to 10 wt. %, microcrack yield stress drops somewhat to 63 ksi, but this still represents a significant improvement over the additive-free system.

The interlaminar shear strength of the composite system increases from 7 ksi at 0 wt. % loading to 15 ksi at 5% particle loading and to 21 ksi at 7.5 wt. % loading, dropping slightly to 18 ksi at 10 % loading. Again, the 7.5 wt. % particulate additive loading appears to offer the highest performance for this particular additive, particularly as the transverse strength also increases from an initial value of 1.5 ksi to 11 ksi at this loading.

While some reductions in ultimate flexural strength are seen with particulate additive additions such as described, ultimate values of 100 ksi and above are still retained at additive levels up to 7.5%. Even at 10 wt. % loading a strength of 78 ksi is retained. Thus, on balance, significant net improvements in the mechanical properties of the composites are achieved at all loading levels shown for this system.

Composites similar to those reported in Table 1 above have been prepared utilizing SiC abrasive grain additives in place of the non-abrasive grain material described in Example 1. While improvements in transverse flexural strength, microcrack yield stress and interlaminar shear strength are seen with these additives, ultimate axial flexural strengths (flexural strengths transverse to the fiber reinforcement axis of the material) are not as high as in the case of the so-called non-abrasive particulate additives.

Figure 2:
FIG. 2 is an electron photomicrograph of a particulate material of abrasive grain type.

FIG. 2 of the drawing is an electron photomicrograph taken at a magnification of approximately 5000x of an abrasive grain SiC powder of the type discussed above, this additive having an average particle size of about 5 μm. When compared with the powder shown in FIG. 1, the powder shown in FIG. 2 exhibits a higher incidence of sharp edges and corners, a factor which could cause damage to silicon carbide fibers coming into contact with the particulate additive during the shaping and consolidation of composites incorporation these grains. In any case, due to their higher axial strength, composites comprising non-abrasive additives, and particularly non-abrasive SiC additives, constitute a hybrid composite system offering significant manufacturing and performance advantages over other known composite systems.

Composite products containing a range of different particulate additive materials may be made following the procedures of Example 1 above. For example, composite samples containing so-called spherical SiC additives of 0.7 μm and 1.5 μm average diameter may be made by blending the additives at various loadings with Corning Code 1723 glass, dispersing the blend in a suitable liquid vehicle, impregnating Nicalon ® yarn with the suspension, and forming the impregnated yarn into green preforms by winding, cutting and stacking the yarn into laminar sheet. The sheets thus provided may then be hot-pressed to form composite plates.

The mechanical properties of selected composite materials produced as described are given in Table 2 below. As in Example 1, the properties shown are determined on thin plate samples prepared by cutting and grinding from larger plates of the composite materials utilizing the sample preparation procedures and testing procedures described in Example 1. Reported in Table 2 for each of the several samples are the loading of the selected particulate additive material, given in weight percent of the total matrix, and the average particle size of the additive. Also recorded are microcrack yield stress (MCY), ultimate and transverse flexural strength (modulus of rupture or MOR), and interlaminar shear stress (ILSS) for each of the samples. All of the strength values are reported in thousands of psi (ksi).

TABLE 2

| Sample No. | Wt. % Filler | MCY (ksi) | ULTIMATE MOR (ksi) | TRANSVERSE MOR (ksi) | ILSS (ksi) |
|---|---|---|---|---|---|
| 1 | 0 | 45 | 120 | 1.5 | 7.0 |
| 5 | 5 (0.7 μm) | 48 | 58 | 9.4 | 11.6 |
| 6 | 7.5 (0.7 μm) | 40 | 42 | 8.0 | 6.8 |
| 7 | 5 (1.5 μm) | 50 | 62 | 10.4 | 14.5 |
| 8 | 7.5 (1.5 μm) | 55 | 95 | 9.0 | 19.5 |
| 9 | 10 (1.5 μm) | 40 | 75 | 8.0 | 18.4 |

As the data in Table 2 indicate, particle size has an important effect on the effectiveness of particulate additive material for enhancing the physical properties of fiber-reinforced composites in accordance with the invention. Thus, while some increases in transverse flexural strength for the 0.7 μm additive are seen at all loadings, significant loss of ultimate strength and decreases in microcrack yield and interlaminar shear strength at the higher loadings makes this material unsuitable for use as a additive.

On the other hand, composites containing up to 10% of 1.5 μm additive in the matrix provide sufficient increases in transverse MOR and interlaminar shear strength to be useful for some composite applications in accordance with the invention notwithstanding the indicated drop in ultimate strength. Based on these data, particulate additive particle sizes of at least about 1 μm are required to provide useful improvements in the physical properties of fiber-reinforced composites of the kind described.

For the manufacture of fiber-reinforced composites wherein the ceramic matrix of the composite consists of a particle-containing glass-ceramic material, glasses of alkaline earth aluminosilicate composition are employed. As noted above, these will normally be selected from alkaline earth aluminosilicate glasses which are thermally crystallizable to products wherein the predominant crystal phase is selected from the group of anorthite and its pseudo-binaries with mullite ($3Al_2O_3 \cdot SiO_2$), cordierite ($2MgO \cdot 2Al_2O_3 \cdot 5SiO_2$), barium osumilite ($BaO \cdot 2MgO \cdot 3Al_2O_3 \cdot 9SiO_2$) albite solid solution ($Na_2O \cdot Al_2O_3 \cdot 6SiO_2$), $Al_2O_3$, $SiO_2$, $CaO \cdot SiO_2$, and gehlenite ($2CaO \cdot Al_2O_3 \cdot SiO_2$). Alternatively, the glasses will be selected from alkaline earth aluminosilicate glasses containing alumina in an amount which is in the range of 10–50 mole percent in excess of that present in stoichiometric triclinic anorthite, such glasses being thermally crystallizable to yield a glass-ceramic material wherein the predominant crystal phases in the glass-ceramic material are triclinic anorthite and mullite and/or alpha alumina.

Table 3 below provides examples of compositions for glass-ceramic matrix materials suitable for use in accordance with the invention. Examples A and B of Table 3 represent glass compositions which are thermally crystallizable to barium-stuffed cordierite as the predominant crystal phase, while compositions C and D form barium osumilite and compositions E and F form anorthite as predominant crystal phases. Compositions G and H represent glasses which are thermally crystallizable to glass-ceramic materials wherein the predominant crystal phase is triclinic anorthite in solid solution with one or both of mullite and/or alumina. Compositions reported in Table 3 are given in weight percent as calculated from the batch.

TABLE 3

|  | A | B | C | D | E | F | G | H |
|---|---|---|---|---|---|---|---|---|
| $SiO_2$ | 42.4 | 43.66 | 50.63 | 53.2 | 45.6 | 48.1 | 35.4 | 40.8 |
| $Al_2O_3$ | 36.0 | 37.11 | 27.66 | 25.0 | 36.2 | 35.6 | 45.0 | 39.7 |
| CaO | — | — | — | — | 14.1 | 8.1 | 16.5 | 19.0 |
| BaO | 6.0 | 6.20 | 13.27 | 12.5 | — | — | — | — |
| MgO | 12.6 | 13.03 | 3.44 | 8.4 | 4.4 | 8.3 | — | — |
| $As_2O_3$ | 0.68 | 0.70 | 1.0 | 1.0 | 0.5 | 0.5 | 0.05 | 0.5 |
| $ZrO_2$ | 3.0 | — | — | — | — | — | 3.0 | — |
| $Cr_2O_3$ | — | — | — | — | — | — | — | 0.1 |

The use of glass-ceramic matrix materials to provide ceramic matrix composite products in accordance with the invention is more fully shown by the following illustrative examples.

EXAMPLE 2

An alkaline earth aluminosilicate glass thermally crystallizable to an anorthite-alumina crystal phase is selected for use as a composite matrix material. The glass has a composition, in weight percent on the oxide basis, of about 16.5% CaO, 45% $Al_2O_3$, 35.4% $SiO_2$, 3% $ZrO_2$ and 0.5% $As_2O_3$, and is milled to an average particle size of about 10μm.

A so-called spherical particulate silicon carbide material, consisting of the SiC material described in Example 1 and having an average particle size of about 6 μm, is selected for use as a matrix additive.

To prepare a glass matrix material containing a homogeneous dispersion of the SiC additive, 5 parts by weight of the additive are mixed with 95 parts by weight of the matrix glass in powder form by ball milling. The ball milling is carried out in a polyethylene jar in an isopropanol vehicle with alumina grinding media. Ball milling is carried out for 1 hour, and the solids are then separated from the resulting slurry by filtration and dried. This procedure results in a uniform dry dispersion of the particles in the slurry.

The fiber selected for incorporation in the composite is the Nicalon ® silicon oxycarbide fiber yarn described above in Example 1. To combine the yarn with the powdered matrix, a slurry is first prepared from the matrix mixture made as described. The slurry is prepared by combining the mixture with an aqueous acrylic binder system comprising an acrylic binder, a dispersant, and a thickener. The resulting slurry contains, in weight percent, about 25% of the matrix mixture, about 46.15% water, about 15.48% isopropanol, about 11.98% of Rohm and Haas HA-8 acrylic binder, about 0.005% of Tamol ™ 850 dispersant, and about 0.009% of TT615 thickener, the binder, dispersant and thickener each being commercially available from the Rohm and Haas Company, Philadelphia, PA, USA.

The SiC fiber yarn is coated with the described slurry by passing a continuous strand of the yarn through the suspension as described in Example 1, but without using a stripping die to remove excess slurry. Again, the slurry immersion thoroughly coats and impregnates the yarn with the whisker-powder mixture.

The coated yarn thus produced is then wound around a rotating drum to form a continuous prepreg sheet having a unidirectional fiber orientation. After drying, this sheet is cut from the drum to provide a green prepreg mat comprising unidirectional fibers coated with the glass-SiC powder mixture.

A consolidated ceramic matrix composite is next provided from the prepreg mat following the procedure of Example 1 by cutting rectangular sections approximately 10 cm × 10 cm in size from the mat and stacking 12 such sections in uniaxial (fiber parallel) alignment to provide a multilayer preform. The preform thus provided is thereafter heated to 450° C. in a forced air oven to remove the organic binder constituents therefrom.

The resulting preform is finally consolidated to full density, with concurrent conversion of the glass matrix material to a crystalline glass-ceramic matrix, by a hot-pressing heat treatment. The preform is gradually heated to a temperature of 1340° C. at a pressure of 1500 psi., and is maintained at that temperature and pressure for approximately 10 minutes, after which it is cooled to room temperature and examined. This treatment effectively transforms the glassy matrix phase to an anorthite-alumina glass-ceramic (crystalline) phase without the need for a separate crystallization treatment, although in some cases the latter can optionally be used.

Test samples are next cut from the composite and tested to determine the physical properties thereof, following the testing procedures utilized to evaluate the Example 1 samples. A comparison of the physical properties of the particle-containing glass-ceramic composite with those of a similarly prepared fiber-reinforced composite, the latter comprising the same Nicalon ® reinforcement and glass-ceramic matrix phase but omitting the particulate additive, shows significant improvements resulting from the incorporation of the additive. Thus, in the additive-containing composite of this Example, the microcrack yield stress has increased from 36 ksi to 53 ksi, the transverse flexural strength has increased from 5.3 ksi to 12.5 ksi, the ultimate flexural strength has increased from 62 ksi to 64 ksi, and the interlaminar shear strength has increased from 3.5 ksi to 11.0 ksi. This represents a significant improvement over the physical properties of the glass-ceramic composite system not containing the particulate additive.

EXAMPLE 3

An SiC-particle-containing glass-ceramic composite article is manufactured following the procedure described in Example 2 above, except that the matrix glass selected for inclusion in the composite is an alkaline earth alumino-silicate glass thermally crystallizable to a barium-stuffed cordierite glass-ceramic material. The selected glass has a composition, on the oxide basis, of about 6% BaO, 12.6% MgO, 36% $Al_2O_3$, 42.4% $SiO_2$, 3% $ZrO_2$ and 0.68% $As_2O_3$, and is milled to an average particle size of about 10 μm. As in Example 2, this glass is combined with particulate SiC as a matrix additive in a proportion providing about 5% SiC by weight in the mixture.

A fiber-reinforced preform comprising the above matrix mixture and Nicalon ® yarn is prepared by yarn impregnation, winding, and sheet stacking as in Example 2, and the preform is consolidated and crystallized by hot-pressing at 1340° C. and 1500 psi. as therein described, the resulting product comprising a matrix wherein barium-stuffed cordierite constitutes the principal crystalline phase. Test samples are then cut from the fiber-reinforced composite plate resulting from the above fabrication procedure to evaluate the plate for physical properties.

A comparison of the physical properties of the particle-containing glass-ceramic composite with those of a similarly prepared fiber-reinforced composite comprising the same Nicalon ® reinforcement and glass-ceramic matrix phase but omitting the particulate additive shows significant improvements resulting from the incorporation of the additive. Thus, in the additive-containing composite of this Example, the microcrack yield stress has increased from 43 ksi to 51 ksi, the transverse flexural strength has increased from 3 ksi to 6 ksi, and the interlaminar shear strength has increased from 4.5 ksi to 14.0 ksi. The ultimate flexural strength has decreased slightly from 111 ksi, but still maintains an adequate level of 90 ksi. Again, a significant net improvement in the physical properties of the glass-ceramic composite system free of particulate additive has been realized.

The performance advantages offered by the particle hybrid fiber-reinforced ceramic matrix composites of the invention cannot be satisfactorily explained simply on the basis of the known strengthening and/or toughening effects of particulate additive additions to ceramic materials. Table 4 below provides some data on the effects of "spherical" particulate SiC additions to a ceramic matrix material free of fiber reinforcement. The ceramic matrix material evaluated in the Table is Corning Code 1723 alkaline earth aluminosilicate glass. The composite materials utilized are prepared by blending glass powder with the indicated proportions of SiC powders such as described in Example 1, and consolidating the mixtures by hot-pressing. Included in Table 4 for each of the materials evaluated are fracture toughness ($K_{IC}$) in (units) and ultimate flexural strength (MOR) in ksi.

TABLE 4

RO—$Al_2O_3$—$SiO_2$ Glass Comprising SiC Particles

| Wt. % Particles | Fracture Toughness ($K_{IC}$) | Ultimate Flexural Strength (ksi) |
| --- | --- | --- |
| 0 | 0.91 (±0.02) | 7.2 (±1.1) |
| 5 (0.7 μm) | 1.28 (±0.06) | 9.3 (±1.0) |
| 7.5 (0.7 μm) | 1.28 (±0.24) | 11.4 (±1.1) |
| 5 (1.5 μm) | 1.44 (±0.03) | 10.8 (±0.3) |
| 7.5 (1.5 μm) | 1.45 (±0.01) | 11.1 (±0.4) |
| 10 (1.5 μm) | 1.57 (±0.08) | 12.1 (±0.6) |
| 5 (6 μm) | 1.35 (±0.03) | 10.8 (±0.6) |
| 7.5 (6 μm) | 1.46 (±0.09) | 12.0 (±0.2) |
| 10 (6 μm) | 1.50 (±0.08) | 11.3 (±0.1) |

As evident from the Table, the strength and fracture toughness of the glass matrix material increases with the addition of the SiC additive. However, the increases are not large, and appear to be relatively independent of particle size and loading, in contrast to the effects of particle additions to the fiber-reinforced composites of the invention. Thus, whereas the strength improvements obtained for the glass alone are of the order of 40 to 70%, the improvements obtained in transverse and interlaminar shear strengths in the fiber-reinforced composites of the invention are of the order of several hundred percent.

Further, whereas property improvements in the glass alone are achieved at all SiC particle sizes, particle sizes of at least about 1 μm appear necessary to achieve useful property improvements in fiber-reinforced composite systems. Thus, for example, at a 0.7 μm SiC additive particle size, the microcrack yield stress of the fiber-reinforced composites shows little change, and the interlaminar shear and transverse strengths actually decrease at higher particle loadings, even though the data in Table 4 indicate that the inherent strength and toughness of the matrix material alone significantly increases with the particle additions.

While the reasons for these effects are not fully understood, there is some evidence, based on failure analyses of particle-containing fiber-reinforced composites, that physical particle-fiber interactions are involved. Another factor may be the relationship between particle size and fiber diameter, this relationship perhaps affecting the hypothesized crack pinning effect in composite materials.

Figure 3:
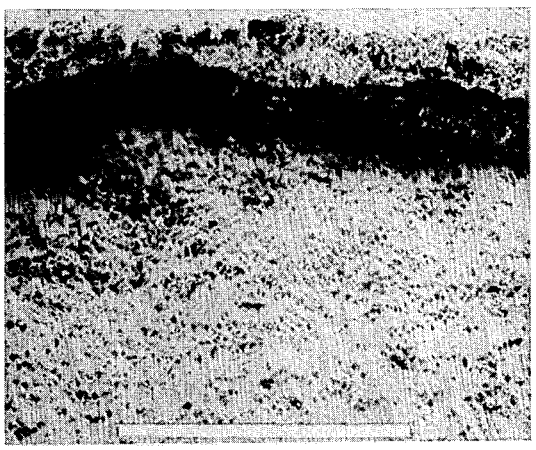
FIG. 3 is an electron photomicrograph of a fracture surface of a particle-containing ceramic matrix composite showing brittle fracture.

FIG. 3 of the drawing is a scanning electron photomicrograph of a fracture surface of a fiber-reinforced composite containing an SiC particulate additive in accordance with the invention. The matrix in the composite shown consists of Corning Code 1723 glass. The particulate additive consists of 6 μm "spherical" SiC at a loading of 7.5% by weight of the matrix, and the fiber reinforcement consists of Nicalon ® yarn. In the photomicrograph, the white bar represents a dimension of 1 mm.

Figure 4:
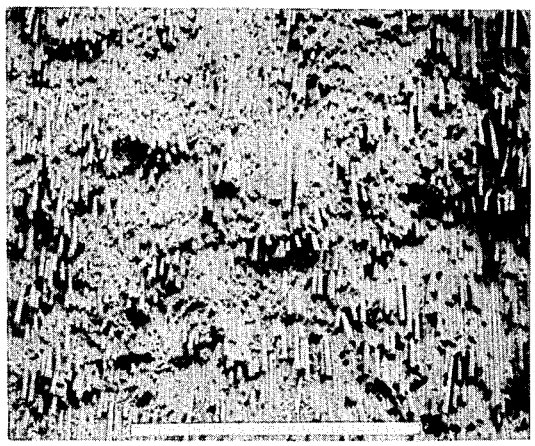
FIG. 4 is an electron photomicrograph of a fracture surface of a particle-containing ceramic matrix composite in accordance with the invention showing non-brittle fracture with fiber pullout.

FIG. 4 of the drawing is a second scanning electron photomicrograph of a fracture surface of a fiber-reinforced composite containing an SiC particulate additive, the additive in this instance consisting of "spherical" SiC of small (0.7 μm) particle size. The matrix again consists of Corning Code 1723 glass and the fiber reinforcement of Nicalon ® yarn. The white bar in FIG. 3 also represents a dimension of 1 mm.

A comparison of the fracture surfaces in the two figures shows a distinct difference in appearance, which correlates well with a difference in fracture behavior observed during the fracture testing of the two materials. The material shown in FIG. 4 exhibited low strain-to-failure and brittle fracture and, typical of that failure mode, the fracture surface shows extensive fiber breakage in the failure plane rather than fiber pullout from the matrix at failure. In contrast, the material shown in FIG. 3 exhibited significantly higher elongation at failure, and the micrograph shows a fibrous, woody fracture surface with noticeable fiber pullout.

Figure 5:
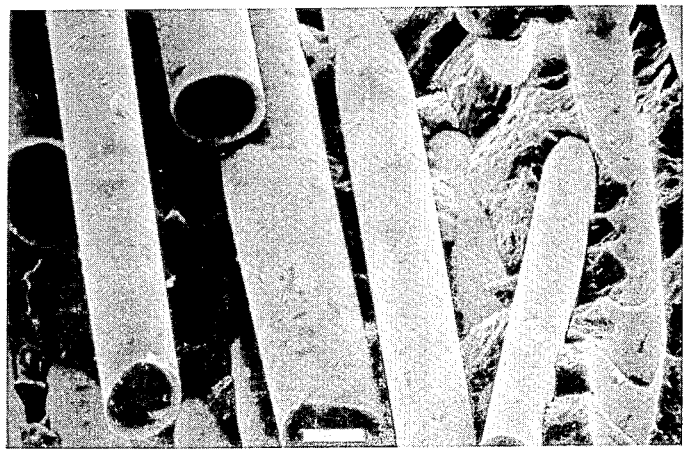
FIG. 5 is an electron photomicrograph of the surface of a group of reinforcing fibers pulled during fracture from a ceramic matrix composite provided in accordance with the invention.

FIG. 5 of the drawing shows a high magnification scanning electron photomicrograph of an individual fiber on the fracture surface of a ceramic matrix composite containing a particulate additive in accordance with the invention. The micrograph shows a skin on the fiber surface, broken at various sites. This type of phenomenon is frequently observed in these composites, and may be due either to the prevention of formation of a surface skin on the fibers at points of contact with the particles, or breakage of the skin due to particle contact after formation. Presumably, extensive damage of this sort could favor fiber breakage rather than fiber pullout in flexural failure in these systems. The use of the larger additive particles, resulting in fewer particles per unit volume of material at a given weight loading, might be a factor influencing the level of fiber damage incurred during the fabrication, consolidation, and/or use of the composites herein described.

Of course, the foregoing specific examples and descriptions are merely illustrative of products and processes which may be provided in accordance with the invention within the scope of the appended claims.

I claim:

1. A laminar ceramic matrix composite article comprising:
    (a) a matrix consisting essentially of a ceramic material selected from the group consisting of alkaline earth alumino-silicate glasses and alkaline earth aluminosilicate glass-ceramics;
    (b) inorganic reinforcing fibers disposed in multiple layers in the matrix, said layers comprising fiber arrays wherein the fibers are disposed in substantially parallel alignment; and
    (c) a particulate additive dispersed in the matrix, said additive comprising particles having aspect ratios below 2:1 and an average particle size of at least about one micron, and said additive being present in a proportion at least effective to increase the interlaminar shear strength, transverse flexural strength, or fracture toughness of the article, but not exceeding about 10% by weight of the combined weight of the particulate additive and alkaline earth aluminosilicate ceramic matrix.

2. A ceramic matrix composite article in accordance with claim 1 wherein the particulate additive phase comprises a particulate material selected from the group consisting of SiC, $Al_2O_3$, $B_4C$, and $ZrO_2$.

3. A ceramic matrix composite article in accordance with claim 2 wherein the particulate additive consists essentially of non-abrasive SiC.

4. A ceramic matrix composite article in accordance with claim 3 wherein the particulate additive constitutes 1–10% by weight of the particle-containing aluminosilicate matrix.

5. A ceramic matrix composite article in accordance with claim 3 wherein the inorganic reinforcing fibers are fibers selected from the group consisting of silicon carbide, silicon oxycarbide, carbon, alumina, $B_4C$, BN, zircon, mullite, spinel, and silicon nitride fibers.

6. A ceramic matrix composite article in accordance with claim 5 wherein the fibers are selected from the group consisting of silicon carbide fibers and silicon oxycarbide fibers.

7. A ceramic matrix composite article in accordance with claim 6 wherein the fibers are in the form of a silicon oxycarbide yarn.

8. A ceramic matrix composite article in accordance with claim 6 wherein the continuous ceramic phase consists essentially of a glass-ceramic material wherein the predominant crystal phase is selected from the group of anorthite and pseudo-binaries thereof with mullite ($3Al_2O_3.SiO_2$), cordierite ($2MgO.2Al_2O_3.5SiO_2$), barium osumilite ($BaO.2MgO.3Al_2O_3.9SiO_2$) albite solid solution ($Na_2O.Al_2O_3.6SiO_2$), $Al_2O_3$, $SiO_2$, $CaO.SiO_2$, and gehlenite ($2CaO.Al_2O_3.SiO_2$).

9. A ceramic matrix composite article in accordance with claim 6 wherein the continuous ceramic phase consists essentially of a glass-ceramic material wherein the predominant crystal phase consists essentially of triclinic anorthite and at least one of mullite and alpha alumina.

10. A ceramic matrix composite article in accordance with claim 9 wherein the glass-ceramic material has a composition consisting essentially, in weight percent on the oxide basis, of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, the composition being substantially free of $TiO_2$ and containing $Al_2O_3$ in an amount which is at least 10 mole percent and up to 50 mole percent in excess of that present in stoichiometric triclinic anorthite.

11. A ceramic matrix composite article in accordance with claim 6 wherein the continuous ceramic phase comprises an alkaline earth aluminosilicate glass having a composition consisting essentially, in weight percent on the oxide basis, of about 50–66% $SiO_2$, 11–19% $Al_2O_3$, 20–30% total of RO, therein RO consists of one or more oxides selected from the group consisting of CaO, MgO, SrO and BaO, 0–8% $B_2O_3$, and 0–2% of $As_2O_3$.

* * * * *